Feb. 11, 1958  J. MacGREGOR ET AL  2,822,930
APPARATUS FOR HANDLING BILLETS
Filed May 24, 1954  2 Sheets-Sheet 1

INVENTORS.
James MacGregor
Charles MacGregor
BY
THEIR ATTORNEYS

Feb. 11, 1958

J. MacGREGOR ET AL 2,822,930

APPARATUS FOR HANDLING BILLETS

Filed May 24, 1954

INVENTORS.
James MacGregor
Charles MacGregor
BY
THEIR ATTORNEYS

United States Patent Office 2,822,930
Patented Feb. 11, 1958

2,822,930

APPARATUS FOR HANDLING BILLETS

James MacGregor and Charles MacGregor, Pittsburgh, Pa., assignors to York Engineering & Construction Company, Pittsburgh, Pa., a corporation of Pennsylvania Application May 24, 1954, Serial No. 431,717

8 Claims. (Cl. 214—1)

This invention relates to apparatus for handling a billet, bloom, or the like. In the processing of such articles, a variety of surface defects appear, such as scabs, checks, and rolled seams. Each surface must be inspected and the defects removed. Prior to our invention turning the billet or bloom for inspection and surface treatment has been done with cranes which is a difficult, dangerous, and time-consuming operation.

Our apparatus greatly facilitates and increases the rate of inspections and surface treatment of billets and blooms. In one form, we provide a support having a number of troughs for the billets so that several billets may be treated at once. The support has a receiving area for the billets and includes means to advance the billets from that area to the troughs. We also rotate the billets within the troughs so that all sides of each billet are easily and conveniently exposed for inspection or surface treatment. When the inspection or treatment is completed, the billets are lifted from the troughs and directed away from the apparatus.

The accompanying drawings illustrate a presently preferred embodiment in which.

Figure 1:
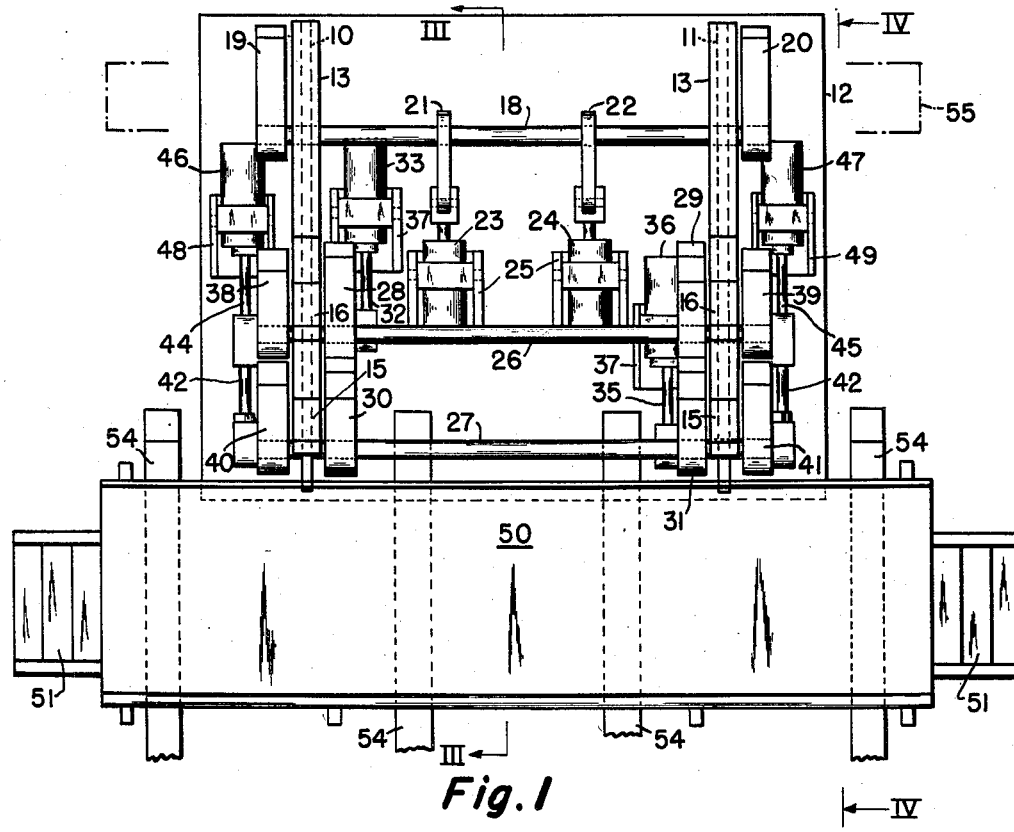
Figure 1 is a plan view of our billet handling apparatus.
Figure 2:
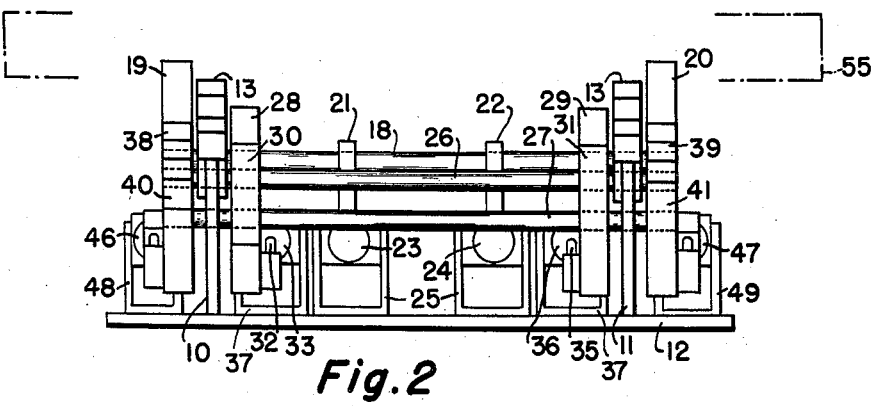
Figure 2 is a front elevation of Figure 1 in which an operator's platform is removed for purposes of illustration.

Referring to the drawings, our apparatus includes a pair of spaced-apart walls 10 and 11 secured to a base 12. The top of each wall has a substantially flat back 13 and a downwardly slanting front 14. Walls 10 and 11 each have troughs 15 and 16, the troughs 15 in wall 10 being in line with trough 15 in wall 11, and the troughs 16 being likewise in line with each other. Each trough has a wear plate 17.

A system of levers controls the movement of the billets in and out of the troughs and tumbles or rotates them about a longitudinal axis while within the troughs. A shaft 18 is mounted for rotation in the walls and carries fixed levers 19 and 20 at its ends. These levers have sufficient length to reach above the backs of the walls and push the billets on the back toward the slanting front and into the troughs. Levers 21 and 22 are also fixed to the shaft 18 and pivotally join the piston rods of fluid-operated cylinders 23 and 24, respectively. The cylinders are trunnion-mounted in pedestals 25 secured to the base 12.

Shafts 26 and 27 are also mounted for rotation in the walls 10 and 11. Shaft 26 carries levers 28 and 29 between and adjacent the walls. Shaft 27 carries levers 30 and 31 similarly positioned. The levers 28 and 29 are of sufficient length to reach above their adjacent troughs 16 and lift a billet therefrom and onto the slanting front below the troughs. The piston rod 32 of a fluid-actuated cylinder 33 pivotally joins an extension 34 of lever 28, while the piston rod 35 of a fluid-actuated cylinder 36 similarly connects to a like extension of lever 31. As before, cylinders 33 and 36 are trunnion-mounted in pedestals 37 carried by the plate 12.

On the outside of the walls the ends of the shaft 26 carry levers 38 and 39, and the ends of shaft 27 carry levers 40 and 41. These levers are free to rotate on the shafts 26 and 27 and those levers adjacent the same wall are connected by links 42 pivotally connected at each end to extensions 43 of these levers. The levers 38 through 41 are of sufficient length to reach only the lowest corner of a billet as it rests in the troughs. The extensions 43 of the rearward levers 38 and 39 also pivotally join the piston rods 44 and 45 of fluid-actuated cylinders 46 and 47, respectively. These cylinders are trunnion-mounted in pedestals 48 and 49 as in the case of the other cylinders.

An operator's platform 50 having steps 51 is located forward of the slanting front of the walls. A piston 52 of a fluid-actuated cylinder (not shown) pivots the platform about the point 53 to allow billets to slide from the front of the walls onto skids 54.

Figure 3:
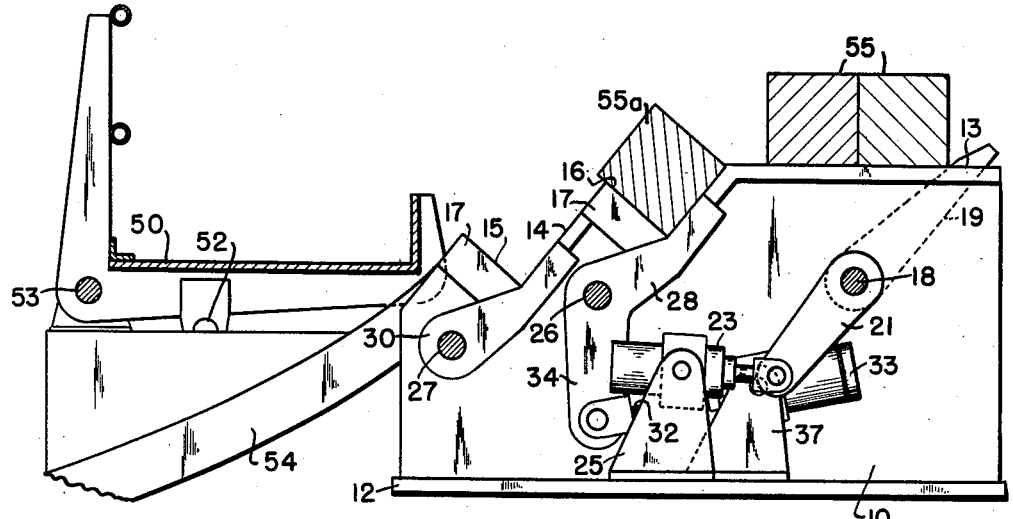
Figures 3 and 4 are sections of Figure 1 on the lines III—III and IV—IV, respectively.

In operation, billets 55 are spaced across the flat backs 13 of the walls. Cylinders 23 and 24 rotate the shaft 18 by the levers 21 and 22 which, in turn, swings the levers 19 and 20 above the walls and toward the platform 50. This pushes the foremost billet down the slanting fronts and into the trough 16 in walls 10 and 11. Cylinder 33 now pivots lever 28 about the shaft 26 and, in so doing, pivots lever 29 fixed to the shaft 26. As shown in Figure 3, these levers engage a billet 55a at a point high on its rearward side to lift the billet from troughs 16 and push it into troughs 15 in walls 10 and 11. Another billet is then advanced to troughs 16.

Figure 5:
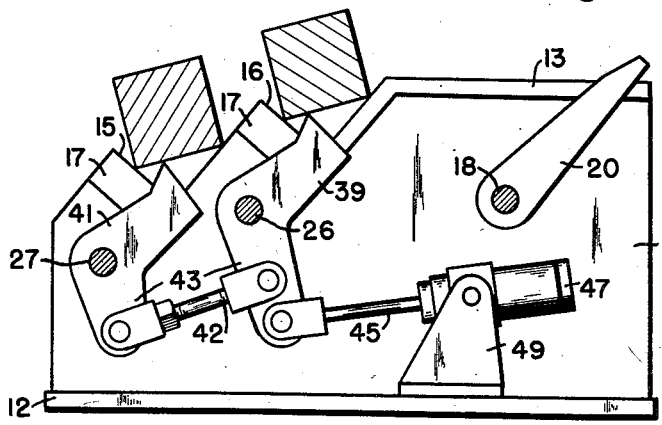
Figure 5 is a section similar to Figure 4 showing the tumbling levers in another position.

The billets are now ready for inspection and surface treatment, such as scarfing. An operator walks along the platform 50 playing an oxygen-fed flame on the closest surface of each billet. It will be noted that, due to the described construction, each billet is readily and conveniently accessible. When the closest side of each billet has been scarfed, levers 38 through 41 rotate or tumble the billet within its supporting troughs. The arc described by the levers 38 through 41 is such that just the tips of the lever engage the lowest corner of the billet in its supporting troughs. This causes the billet to tumble or rotate 90 degrees in a clockwise direction as viewed, for example, in Figure 5, thereby presenting another side of the billet toward the operator's platform 50. During the backward stroke of the levers 38 through 41, the billets are again lifted from their troughs by the movement of the levers but not enough to change their positions. The sides of the billets now facing the operator are scarfed after which the billets are again rotated and scarfed as described until all sides have been treated.

Figure 4:
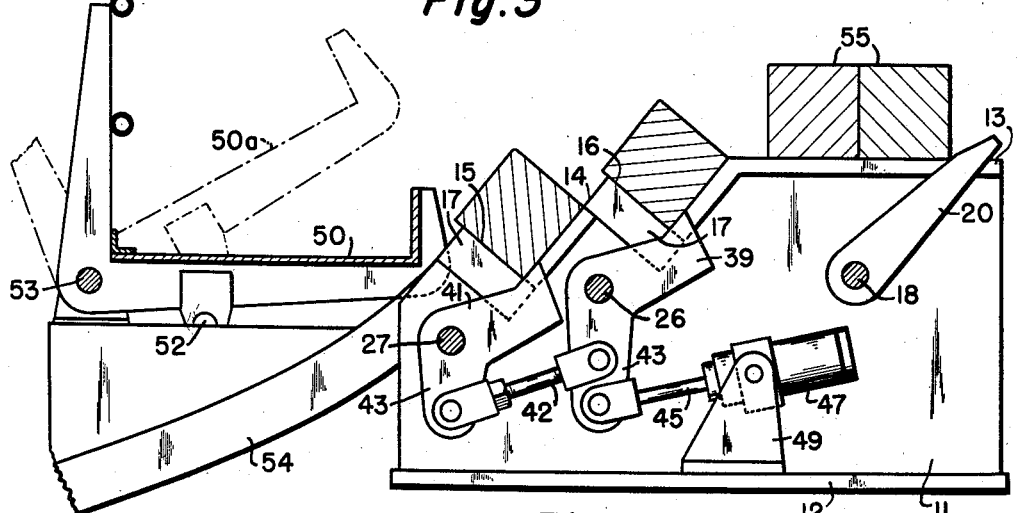

The operator is now ready to deliver the scarfed billets. Piston 52 lifts the platform 50 to the position 50a shown by a dot and dash line in Figure 4. Cylinder 36 pivots lever 31 about the shaft 27, thereby also pivoting lever 30, to eject the billet from the troughs 15 onto the skids 54 which deliver the billet to another station. Levers 28 and 29 are now operated as before to move the billet from troughs 16 to troughs 15, whereupon that billet is ejected from the last trough onto the skids 54 in the manner of the previous billet. Piston 52 now returns the platform to its original position, and the cycle as described is repeated.

While the foregoing disclosure describes a presently preferred embodiment, it is understood that the invention may be practiced in other forms within the scope of the appended claims.

We claim:

1. Apparatus for handling billets or like articles including a pair of parallel, spaced-apart support walls, the top of each wall having a substantially flat back and a downwardly slanting front, the flat backs of the walls being adapted to support billets lying transversely thereof, at least two corresponding troughs in the front of each wall to receive and retain a billet, a rotatable shaft extending transversely of the walls and having a lever adapted to urge the billets from the flat backs of the tops of the walls down the slanting fronts whereby the first troughs receive a billet, an additional rotatable shaft extending transversely of the walls for each set of corresponding troughs and having a lever adapted to lift a billet from each set onto the slanting front of the wall below the troughs, another lever on each of said additional shafts having relative movement therewith and adapted to rotate a billet about its longitudinal axis within each set of corresponding troughs whereby all sides of the billet may be exposed for scarfing and similar treatments.

2. Apparatus for handling billets or like articles including a pair of parallel, spaced-apart support walls, the top of each wall having a substantially flat back and a downwardly slanting front, the flat backs of the walls being adapted to support billets lying transversely thereof, at least two corresponding troughs in the front of each wall to receive and retain a billet, a shaft extending transversely of the walls below the flat backs and mounted therein for rotation, a lever fixed to the shaft having sufficient length to reach above the backs of the walls and urge the billets thereon from the backs to the slanting fronts whereby the first troughs receive a billet, an additional shaft extending transversely of the walls adjacent each set of corresponding troughs and mounted in the walls for rotation, a lever fixed to each of said additional shafts and having sufficient lengths to reach above the troughs and lift a billet therefrom onto the slanting front below said troughs, a further lever mounted on each of said additional shafts for relative movement therewith and having sufficient length to reach only substantially the lowest corner of a billet whereby the billet is rotated about its longitudinal axis within each set of corresponding troughs, means to pivot the levers, and a skid to receive the billets from the slanting fronts.

3. Apparatus for handling billets or like articles including a pair of parallel, spaced-apart support walls, the top of each wall having a substantially flat back and a downwardly slanting front, the flat backs of the walls being adapted to support billets lying transversely thereof, at least two corresponding troughs in the front of each wall to receive and retain a billet, a shaft extending transversely of the walls below the flat backs and mounted therein for rotation, levers fixed to the terminals of the shaft adjacent the walls having sufficient length to reach above the backs of the walls and urge the billets thereon from the backs to the slanting fronts whereby the first troughs receive a billet, an additional shaft extending transversely of the walls adjacent each set of corresponding troughs and mounted in the walls for rotation, levers fixed to each of said additional shafts between and adjacent the walls and having sufficient length to reach above the troughs and lift a billet therefrom onto the slanting front below said troughs, further levers mounted on the terminals of each of said additional shafts for relative movement therewith beyond each wall and having sufficient length to reach only substantially the lowest corner of the billet whereby the billet is rotated about its longitudinal axis within the troughs, a connector pivotally secured at each end to levers of the type last mentioned and between said additional shafts whereby pivoting one of said lever pivots those connected to the other shafts, means to pivot the other levers, skids extending downwardly from the slanting fronts of the walls to receive billets therefrom, and a removable platform extending transversely of the walls adjacent the slanting fronts.

4. Apparatus for handling billets or like articles including a pair of parallel, spaced-apart support walls, the top of each wall having a substantially flat back and a downwardly slanting front, the flat backs of the walls being adapted to support billets lying transversely thereof, at least two corresponding troughs in the front of each wall to receive and retain a billet, a shaft extending transversely of the walls below the flat backs and mounted therein for rotation, levers fixed to the terminals of the shaft adjacent the walls having sufficient length to reach above the backs of the walls and urge the billets thereon from the backs to the slanting fronts whereby the first troughs receive a billet, an additional shaft extending transversely of the walls adjacent each set of corresponding troughs and mounted in the walls for rotation, levers fixed to each of said additional shafts between and adjacent the walls and having sufficient length to reach above the troughs and lift a billet therefrom onto the slanting front below said troughs, further levers mounted on the terminals of each of said additional shafts for relative movement therewith beyond each wall and having sufficient length to reach only substantially the lowest corner of the billet whereby the billet is rotated about its longitudinal axis within the troughs, a connector pivotally secured at each end to levers of the type last mentioned and between said additional shafts whereby pivoting one of said lever pivots those connected to the other shafts, and means to pivot the other levers.

5. Apparatus for handling billets or like articles including a pair of parallel, spaced-apart support walls having a downwardly slanting front, at least two corresponding troughs in the front of each wall to receive and retain a billet descending said slanting front, a shaft extending transversely of the walls adjacent each set of corresponding troughs and mounted in the walls for rotation, levers fixed to each of said shafts between and adjacent the walls and having sufficient length to reach above the troughs and lift a billet therefrom onto the slanting front below said troughs, further levers mounted on the terminals of each of said shafts for relative movement therewith and having sufficient length to reach only substantially the lowest corner of the billet whereby the billet is rotated about its longitudinal axis within the troughs, and a connector pivotally secured at each end to levers of the type last mentioned and between said shafts whereby pivoting one of said levers pivots those connected to the other shafts.

6. Apparatus for handling billets or like articles including a pair of parallel, spaced-apart support walls having a downwardly slanting front, at least two corresponding troughs in the front of each wall to receive and retain a billet descending said slanting front, a shaft extending transversely of the walls adjacent each set of corresponding troughs and mounted in the walls for rotation, levers fixed to each of said shafts between and adjacent the walls and having sufficient length to reach above the troughs and lift a billet therefrom onto the slanting front below said troughs, and further levers mounted adjacent the terminals of each of said shafts for relative movement therewith and having sufficient length to reach only substantially the lowest corner of the billet whereby the billet is rotated about its longitudinal axis within the troughs.

7. Apparatus for handling billets or like articles including a pair of parallel, spaced-apart support walls, each wall having a downwardly slanting front, means adjacent the top of the wall fronts for supporting billets, at least one trough in the front of each wall and in line with a corresponding trough in the other wall to receive and retain a billet, a lever pivotally mounted with respect to the top of a wall to urge the billets from the supporting means at the top of the wall fronts down the slanting fronts whereby the troughs receive a billet, a lever pivotally mounted adjacent each trough to lift a billet from the trough and onto the slanting front below the trough, and an additional lever pivotally mounted adjacent each trough and actuated separately from the billet lifting lever to rotate a billet within the trough about a longitudinal axis whereby all sides of the billet are exposed for treatment.

8. Apparatus for handling billets or like articles including a pair of parallel, spaced-apart support walls having a downwardly slanting front, at least one trough in the front of each wall and in line with a corresponding trough in the other wall to receive and retain a billet descending said slanting front, a shaft extending transversely of the walls adjacent the troughs and mounted in the walls for rotation, levers fixed to the shaft between and adjacent the walls and having sufficient length to reach above the troughs and on rotation of the shaft lift a billet therefrom onto the slanting front below said troughs, and a second set of levers pivotally mounted adjacent the troughs and having arms of sufficient length to reach only substantially the lowest corner of the billet whereby on movement of the levers about their pivots the billet is rotated about its longitudinal axis within the troughs, and means for actuating said second set of levers independently of movement of said shaft.

References Cited in the file of this patent

UNITED STATES PATENTS

| | | |
|---|---|---|
| 816,323 | Hellstrom | Mar. 27, 1906 |
| 1,076,166 | Slick | Oct. 21, 1913 |
| 1,761,470 | Fisk | June 3, 1930 |
| 2,621,805 | Young | Dec. 16, 1952 |

FOREIGN PATENTS

| | | |
|---|---|---|
| 584,513 | Germany | Sept. 21, 1933 |